(12) United States Patent　　　　(10) Patent No.:　US 12,680,356 B2

Cook　　　　　　　　　　　　　　　(45) Date of Patent:　　　Jul. 14, 2026

---

(54) DOOR HINGE

(71) Applicant: SROOC Holdings, LLC, Waco, TX (US)

(72) Inventor: Jerrod Chance Cook, Lorena, TX (US)

(73) Assignee: SROOC Holdings, LLC, Waco, TX (US)

( * ) Notice: Subject to any disclaimer, the term of this patent is extended or adjusted under 35 U.S.C. 154(b) by 502 days.

(21) Appl. No.: 18/155,719

(22) Filed: Jan. 17, 2023

(65) Prior Publication Data

US 2023/0160244 A1　　May 25, 2023

Related U.S. Application Data

(62) Division of application No. 29/797,856, filed on Jul. 2, 2021, now Pat. No. Des. 1,046,596.

(60) Provisional application No. 63/266,897, filed on Jan. 18, 2022.

(51) Int. Cl.
| | |
|---|---|
| *E05D 3/12* | (2006.01) |
| *B60J 5/04* | (2006.01) |
| *E05D 5/02* | (2006.01) |
| *E05B 85/04* | (2014.01) |

(52) U.S. Cl.
CPC ............ *E05D 3/127* (2013.01); *B60J 5/0487* (2013.01); *E05D 5/0207* (2013.01); *E05B 85/04* (2013.01); *E05Y 2900/531* (2013.01)

(58) Field of Classification Search
CPC ...... E05D 3/127; E05D 5/0207; B60J 5/0487; B60J 5/0488
USPC .................................................. 296/146.11
See application file for complete search history.

(56) References Cited

U.S. PATENT DOCUMENTS

| | | | |
|---|---|---|---|
| D3,534 S | 6/1869 | Parker | |
| D9,660 S | 11/1876 | Leger | |
| D187,262 S | 2/1960 | Anderson | |
| D198,670 S | 7/1964 | Anderson | |
| 3,389,503 A | 6/1968 | Goess et al. | |
| D236,797 S | 9/1975 | Davis | |
| D241,511 S | 9/1976 | Sanderford | |
| 4,675,940 A * | 6/1987 | Brockhaus | .............. E05D 5/127 |
| | | | 16/385 |
| 5,018,243 A | 5/1991 | Anspaugh et al. | |
| D324,987 S | 3/1992 | Pihl | |
| 5,509,175 A | 4/1996 | Baughan et al. | |
| D372,415 S | 8/1996 | Guidotti | |

(Continued)

OTHER PUBLICATIONS

U.S. Appl. No. 29/797,856, filed Jul. 2, 2021, Jerrod Chance Cook, Entire Document.

(Continued)

*Primary Examiner* — Jason S Morrow

(74) *Attorney, Agent, or Firm* — Michael Scheinberg; Scheinberg & Associates, PC

(57)　　　　　　ABSTRACT

A method and apparatus for providing a replacement door to a UTV/ATV to replace a mesh door with a panel door employs a hinge member that is mounted to the UTV/ATV after removal of the mesh door. The mesh door and other components are removed from the UTV/ATV. The hinge member includes a first and second angled flanges adapted to mount to the frame of the UTV/ATV after removal of the mesh door. Striker components are mounted to the frame to engage the door latches. The replacement panel door mounts to the hinge member and provides panel doors to the UTV/ATV.

18 Claims, 14 Drawing Sheets

(56) References Cited

U.S. PATENT DOCUMENTS

| | | | |
|---|---|---|---|
| D439,130 S | 3/2001 | Ford et al. | |
| 6,336,675 B1 | 1/2002 | Bruckner | |
| 6,773,054 B2 * | 8/2004 | Martini | B60J 5/0487 |
| | | | 296/148 |
| 6,901,634 B2 | 6/2005 | Shaw et al. | |
| 6,935,676 B2 | 8/2005 | Plavetich | |
| D510,255 S | 10/2005 | Yamaguchi | |
| D622,631 S | 8/2010 | Lai et al. | |
| D642,493 S | 8/2011 | Goebert et al. | |
| 8,220,862 B2 * | 7/2012 | Kaita | E05D 5/062 |
| | | | 296/146.5 |
| 8,307,514 B2 * | 11/2012 | Clark, Sr. | E05D 11/00 |
| | | | 16/386 |
| 8,967,569 B2 | 3/2015 | Hsu | |
| 8,998,289 B2 * | 4/2015 | Peterson | E05D 9/00 |
| | | | 16/261 |
| D737,724 S | 9/2015 | Schroeder et al. | |
| 9,387,747 B2 * | 7/2016 | Wang | B60J 5/062 |
| D789,766 S | 6/2017 | Todd, Jr. et al. | |
| 9,822,562 B2 * | 11/2017 | Borth | B60J 5/00 |
| 9,863,175 B2 * | 1/2018 | Murray | E05D 5/12 |
| 10,183,558 B2 * | 1/2019 | Deckard | B60N 2/986 |
| D856,847 S | 8/2019 | Wang | |
| 10,525,799 B2 * | 1/2020 | Hisamura | B60J 5/0415 |
| 10,632,823 B1 * | 4/2020 | Osorio | B60J 5/0416 |
| D934,118 S | 10/2021 | Schroeder et al. | |
| 11,135,906 B2 * | 10/2021 | Getzschman | B60J 1/10 |
| 11,345,219 B2 * | 5/2022 | Getzschman | B60J 5/0402 |
| 11,624,224 B2 * | 4/2023 | Kovach | E05D 5/0207 |
| | | | 16/262 |
| 12,194,821 B2 * | 1/2025 | Tsurumi | B60J 5/0487 |
| 2003/0014838 A1 | 1/2003 | deOliveira et al. | |
| 2003/0233732 A1 | 12/2003 | Kohlstrand et al. | |
| 2008/0092332 A1 | 4/2008 | Lowen et al. | |
| 2011/0089801 A1 | 4/2011 | Bonomie et al. | |
| 2013/0298352 A1 | 11/2013 | Mazzei | |
| 2015/0035812 A1 | 2/2015 | Shin et al. | |
| 2015/0358512 A1 | 12/2015 | Mitsui | |
| 2021/0340802 A1 | 11/2021 | Wu | |
| 2022/0111708 A1 * | 4/2022 | Krapfl | B60J 5/0463 |
| 2023/0160244 A1 | 5/2023 | Cook | |
| 2024/0408944 A1 * | 12/2024 | Sauvageau | B60J 5/0487 |

OTHER PUBLICATIONS

"AA Ignition Front Left Driver Side Lower Door Hinge" Nov. 5, 2016, Amazon, site visited Aug. 2, 2023: https://www.amazon.com/Front-Left-Driver-Lower-Hinge/dp/B082VDQM5B/ (Year: 2016).

"Korop Auto Parts Upper Right Passenger Side Front Door Hinge" Jun. 24, 2021, Amazon, site visited Aug. 2, 2023: https:// www.amazon.com/dp/B097TNLNRN/ (Year: 2021).

"PT Auto Warehouse DoorHinge" Mar. 31, 2018, Amazon, site visited Aug. 2, 2023: https://www.amazon.com/ PT-Auto-Warehouse-DH-GM6547U-FL-Driver/dp/B07BVSZGX4/ (Year: 2018).

Dorman 924-102 Front Driver Sider Upper Door Hinge Oct. 10, 2007, Amazon, site visited Aug. 2, 2023: https://www.amazon.com/Dorman-924-102-Door-Hinge-Assembly/dp/B001C96ZTI/ (Year: 2007).

* cited by examiner

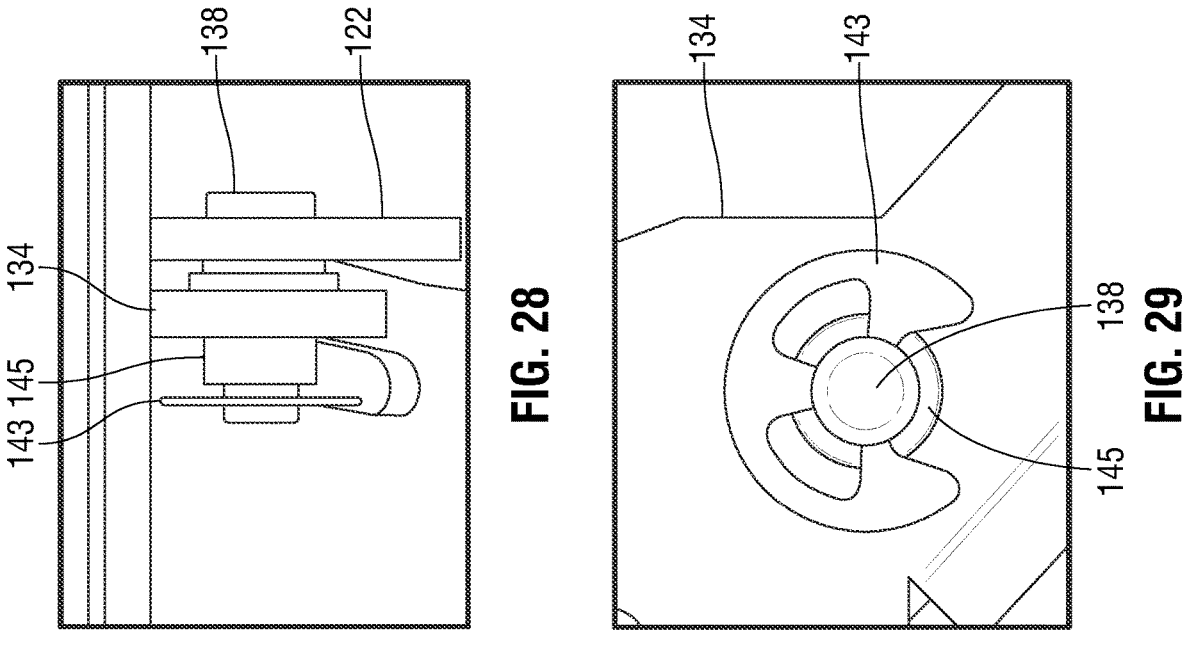
FIG. 28
FIG. 29
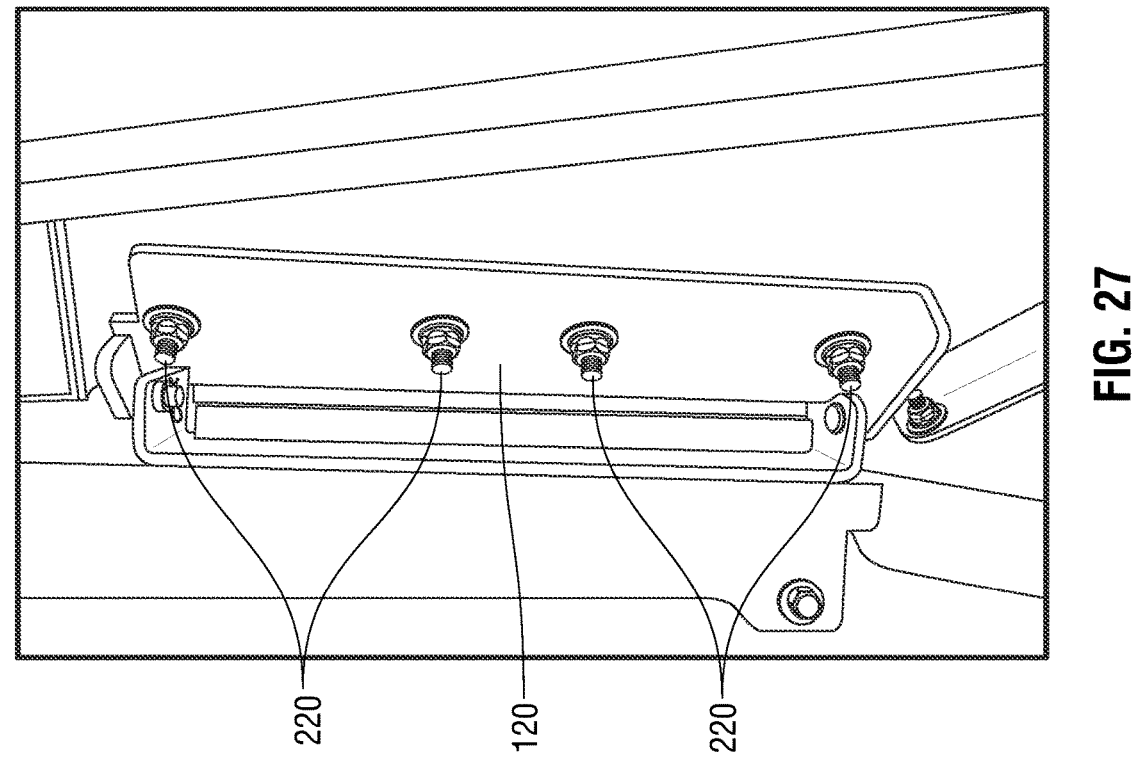
FIG. 27

DOOR HINGE

This application claims priority from U.S. Prov. Pat. App. 63/266,897, filed Jan. 18, 2022, and is a divisional of U.S. Design patent application Ser. No. 29/797,856, filed Jul. 2, 2021, both of which are hereby incorporated by reference.

TECHNICAL FIELD OF THE INVENTION

The present invention relates to hinges, and more particularly to a hinge for enabling installation of a door or half door on a vehicle, such as off road utility vehicles or the like.

BACKGROUND OF THE INVENTION

Utility vehicles (UTV) or all terrain vehicles (ATV) are often sold without doors, instead employing a mesh-fabric 'door' that is removably attached to allow entry and exit from the vehicle, while providing some enclosure when driving to contain any loose items from unintentionally falling out of the vehicle. An example view of such a utility vehicle is shown in FIG. 1, wherein the vehicle 10 has a frame 12 mounting four wheels 14. In the illustrated version, four seats 16 are provided to accommodate driver/passengers 18. A propulsion engine is mounted to the frame at the rear of the illustrated UTV or ATV. A cargo carrying area 22 may be provided in some models. Mesh half 'doors' 24 are detachably positioned at lower portions of openings in the frame to allow driver/riders to enter/exit the vehicle easily, but still allow closure of the 'doors'. The illustrated UTV has four seats and front and rear mesh doors on each side of the vehicle, but two seat/two 'door' models are also provided.

Many users of such vehicles would prefer to have a more solid door structure, either a partial or half door or a full door to provide further protection and minimize debris, splashes or other incursions from outside the vehicle hitting the driver or passengers or entering the frame interior. As such, add on door kits have been developed, such as shown in FIG. 2, that comprise front and rear doors 26, 28 (driver side doors shown, passenger side doors would typically be mirror images) and attachment hardware for mounting the doors to the frame of the UTV. The attachment hardware might include upper and lower hinge leaf (female) mounts 30, 32, for attachment to the doors, and hinge pin assembly bracket 34 which carries upper and lower bullet hinge pins (male) 36, 38. To mount the doors to the UTV or ATV, the existing mesh 'door' is removed, bracket 34 is mounted to the frame of the UTV/ATV, upper and lower hinge pin mounts 30, 32 are mounted to the door(s) at points 40, 42, and the doors are lowered onto the bullet hinge pins. Additional brackets 44 may be provided to assist with securing the bracket 34 to the UTV/ATV's frame.

Unfortunately, the bullet hinge pins will occasionally break as a result of the stresses put on the pins in use, making the door inoperable, so another way to mount doors to UTVs/ATVs that would be more durable and robust is desirable.

SUMMARY OF THE INVENTION

An object of the invention is to provide a method and apparatus for mounting doors to UTVs/ATVs or other vehicles to replace the stock mesh 'doors'. An improved bracket mounting a hinged plate is provided for attachment to a door that is to be mounted to the UTV/ATV.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which:

FIGS. 26-27 show attachment of the doors to the hinge assembly and UTV/ATV; and

FIGS. 28 and 29 illustrates details of the rotational mounting of the door mounting plate to the frame mounting plate.

DETAILED DESCRIPTION OF PREFERRED EMBODIMENTS

A preferred embodiment of the invention uses a hinge assembly and lower bracket members to hingedly mount a door to the frame of an UTV/ATV, for providing an improved door structure to the UTV/ATV over the stock mesh doors. A striker bracket may be provided to engage with a latch member to secure the door when in a closed position.

Figure 1:
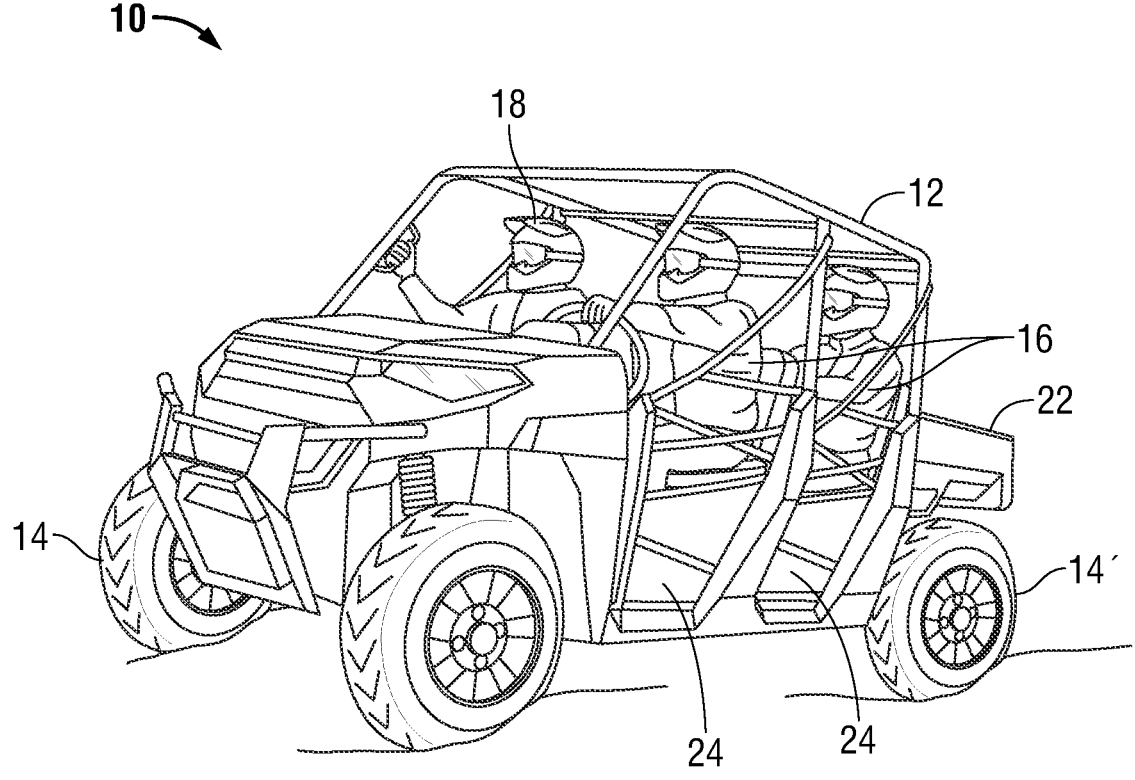
FIG. 1 is a view of a UTV, illustrating the mesh doors.
Figure 2:
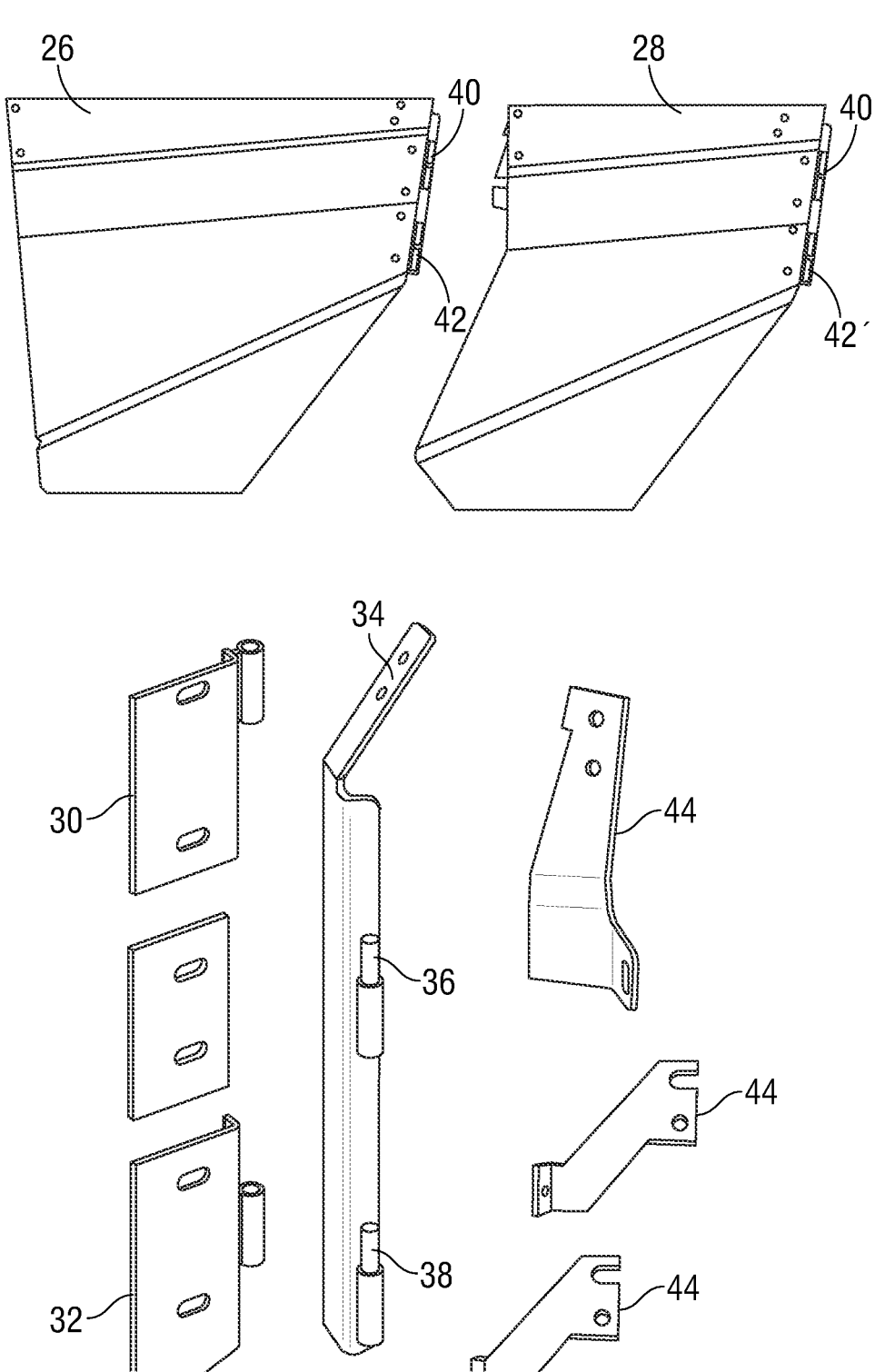
FIG. 2 shows a prior art bullet hinge mounting solution for installing doors on a UTV.
Figure 3:
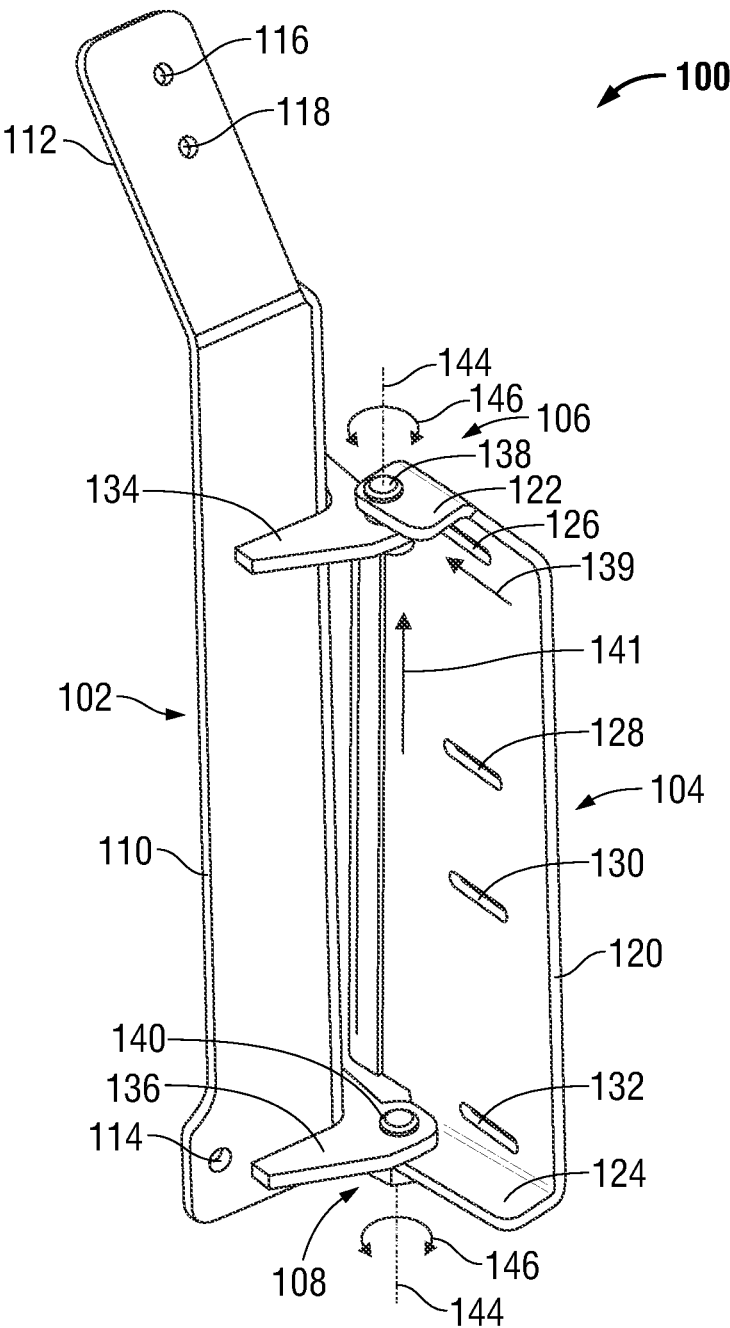
FIG. 3 is a perspective view of a hinge assembly in accordance with the preferred embodiment.

Referring to FIG. 3, a perspective view of a hinge assembly according to the present invention, the assembly 100 comprises an UTV/ATV frame mounting plate 102 and a door mounting plate 104 where the mounting plate 104 is hingedly mounted to plate 102 via upper and lower hinge members 106, 108. Frame mounting plate 102 is formed as an elongate member with a flat longer rectangular flange portion 110 and a shorter upper portion 112 that is angled away from the plane of the portion 110. The lower end of portion 110 flares out slightly and carries fastener mounting hole 114, while the upper portion 112 carries mounting holes 116, 118 in spaced relation to one another.

Door mounting plate 104 is formed as a flat rectangular plate member 120 with upper and lower hinge mounting flange portions 122, 124 extending at 90 degree angles from the main flat portion plate member 120. Mounting slots 126, 128, 130 and 132 are formed in plate member 120 at spaced locations from one another somewhat centrally positioned in the plate member.

Upper and lower mounting flanges 134, 136 connected to flange portion 110 at a somewhat upper position and a lower position, interact with mounting flange portions 122, 124, with hinge pins 138, 140 hingedly mounting the door mounting frame 104 to frame mounting plate 102, via holes or openings formed in flanges 134 and 136, as well as in flange portions 122, 124, allowing rotational movement of the door mounting frame 104 relative to the frame mounting plate on axis 144, as shown by rotational arrows 146. The rotational mounting details are further described in connection with FIG. 28, a partial side view taken in the direction of arrow 139 of FIG. 3 and FIG. 29 a partial view taken in the direction of arrow 141 of FIG. 3.

Hinge pin 138 (and correspondingly 140) passes through holes in flange portion 122 (and 124), held in position by the head of the hinge pin at one end thereof, and by keeper 143, such as an E style clip in the illustrated embodiment, engaged with the end of the pin opposite the head, to keep the pin from sliding out. A bushing 145 lines the openings in flanges 122 and 134, allowing rotational movement of flange 122 relative to flange 134.

Figure 4:
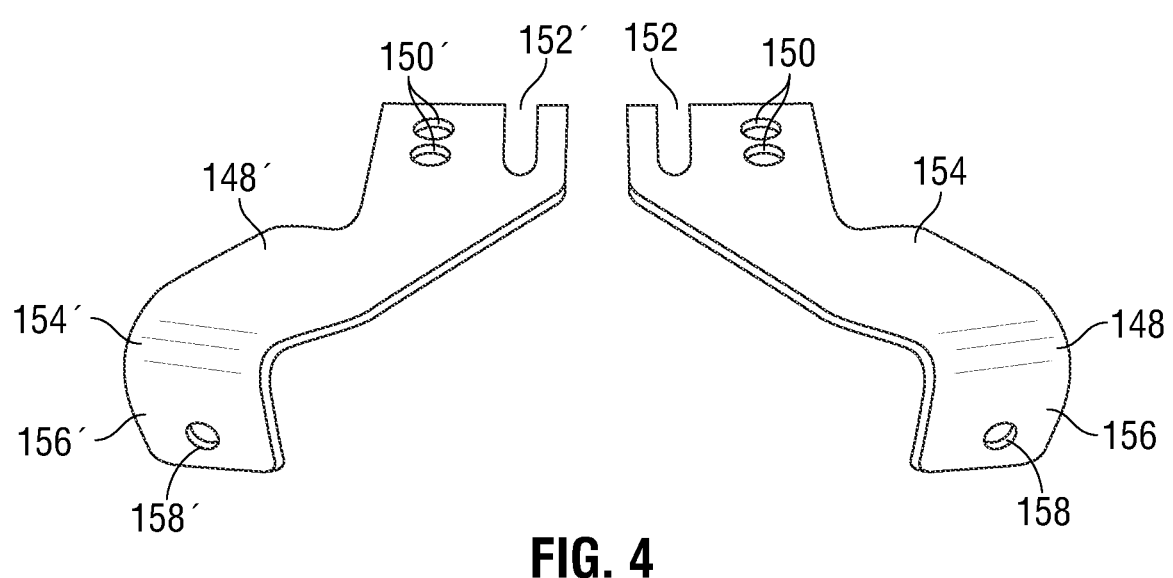
FIG. 4 is a perspective view of a lower mounting bracket.

The hinge assembly needs to be secured to the frame of the UTV/ATV, so mounting components are also provided. Referring to FIG. 4, a perspective view of a lower mounting bracket, lower brackets are provided as a left side bracket 148 and right side bracket 148'. The brackets have rear mounting holes 150, 150' and mounting slots 152, for attachment to the UTV/ATV frame as discussed hereinbelow, and have an angled central region 154 that extends to a mounting plate portion 156 that is oriented to provide a vertically aligned mounting surface. Portion 156 has mounting hole(s) 158 designed to align with fastener mounting hole 114 on the hinge assembly, discussed hereinbelow.

Figure 5:
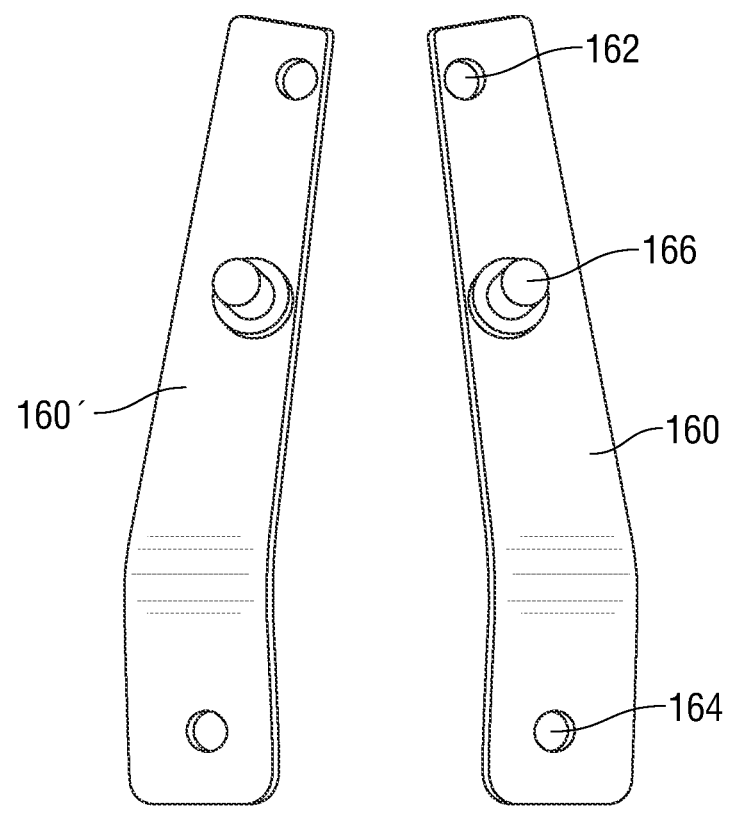
FIG. 5 is a view of a striker bracket.

FIG. 5 illustrates an additional mounting component, striker brackets 160 (left side) and 160' (right side) that have upper and lower mounting holes 162, 164, for attachment to the UTV/ATV frame and carry a striker latch pin 166 (166') for latching with a corresponding door latch mechanism on the doors. The lower portion of the striker brackets angle slightly to conform to the configuration of the UTV/ATV frame for mounting. The striker brackets are mounted to the frame via fasteners interacting through holes 162, 164.

Figure 6:
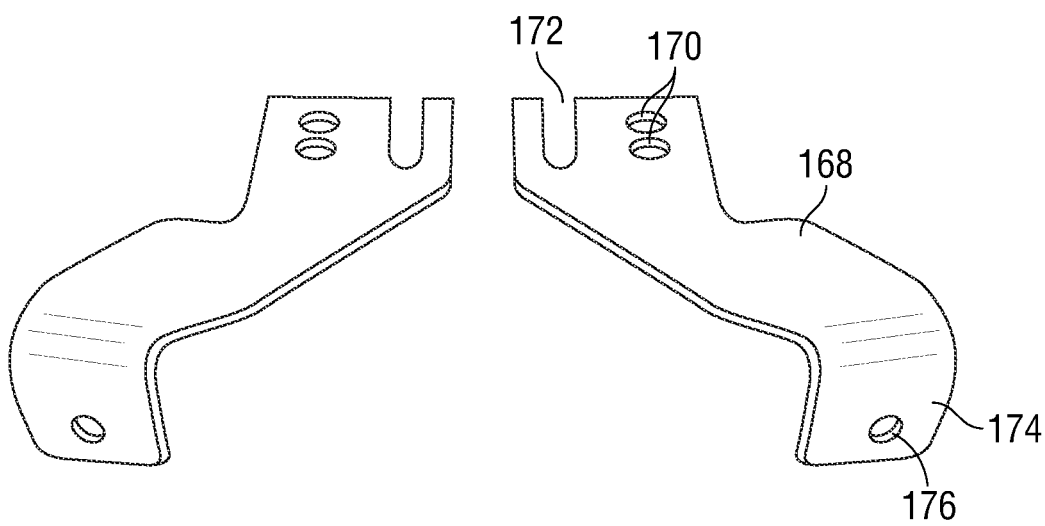
FIG. 6 is a perspective view of a rear lower mounting bracket.
Figure 7:
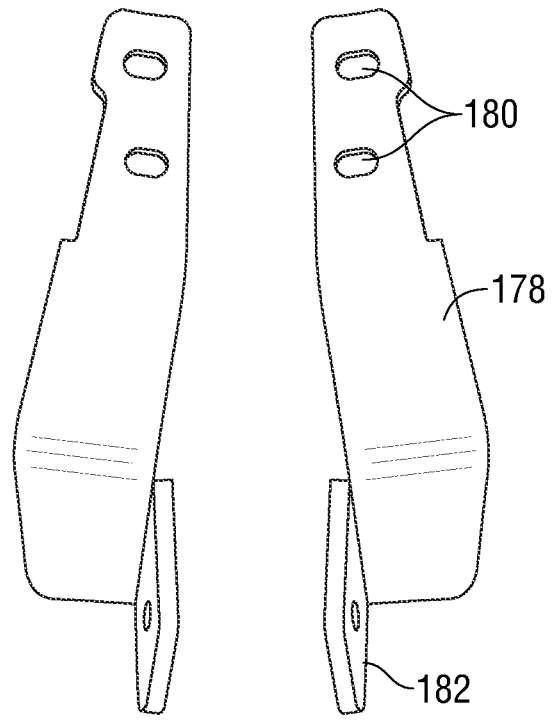
FIG. 7 is a view of a rear striker bracket.
Figures 22, 23, 24:
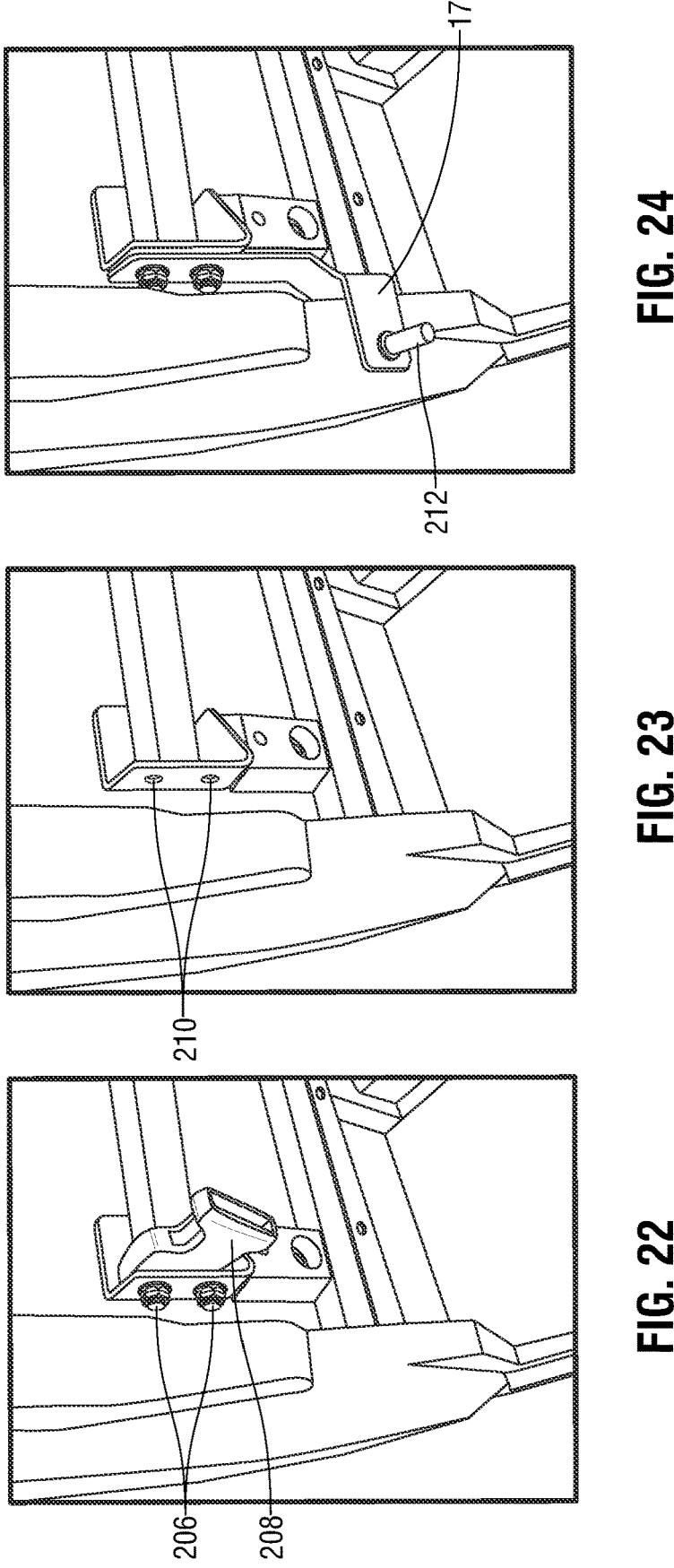
FIGS. 22-24 show mounting steps for the rear striker plate.

FIG. 6 and FIG. 7 are perspective views of a rear lower mounting bracket 168, with corresponding mounting holes 170, slots 172 and mounting plate portion 174 with fastener hole 176 and an rear striker plate mounting plate portion 178, fastener holes 180 and a striker mounting portion 182, angled to enable mounting of a striker 212 thereon (not shown in FIG. 7, visible in FIG. 24). The lower and striker mounting portions can be suitable, for example, for rear door mounting, while the mounting bracket 148 and striker plate 160 would be used for a front door mounting, in the case of an UTV/ATV having front and rear doors, used when both front and rear mesh 'doors' are being replaced.

Figure 8:
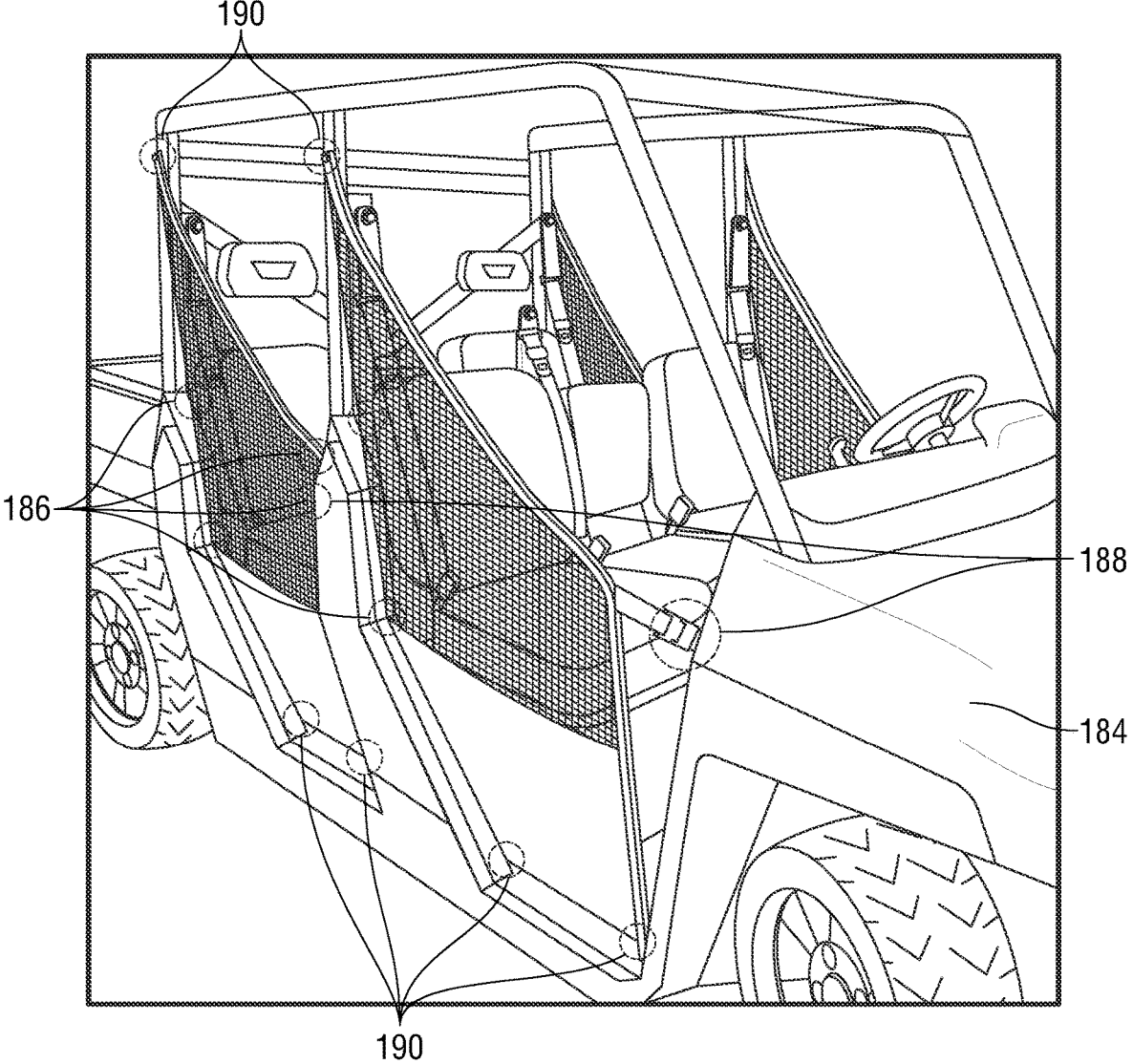
FIG. 8 is a perspective view of an UTV/ATV, for illustration of the process of installing the components of the invention on the UTV/ATV.

Referring now to FIG. 8, the process of mounting doors to an UTV/ATV in accordance with the invention is discussed. In FIG. 8, a passenger side perspective view of an UTV/ATV 184, a first step is to remove the stock mesh doors by removing the mounting hardware thereof at positions indicated by arrows 186. Also, the front and rear mesh door latches are removed at positions 188. Mounting hardware at positions 190 are also removed, to allow removal of the doors, but at these positions the hardware is then returned into the mounting holes once the mesh doors have been removed, for use later in the process.

Figures 9, 10, 11:
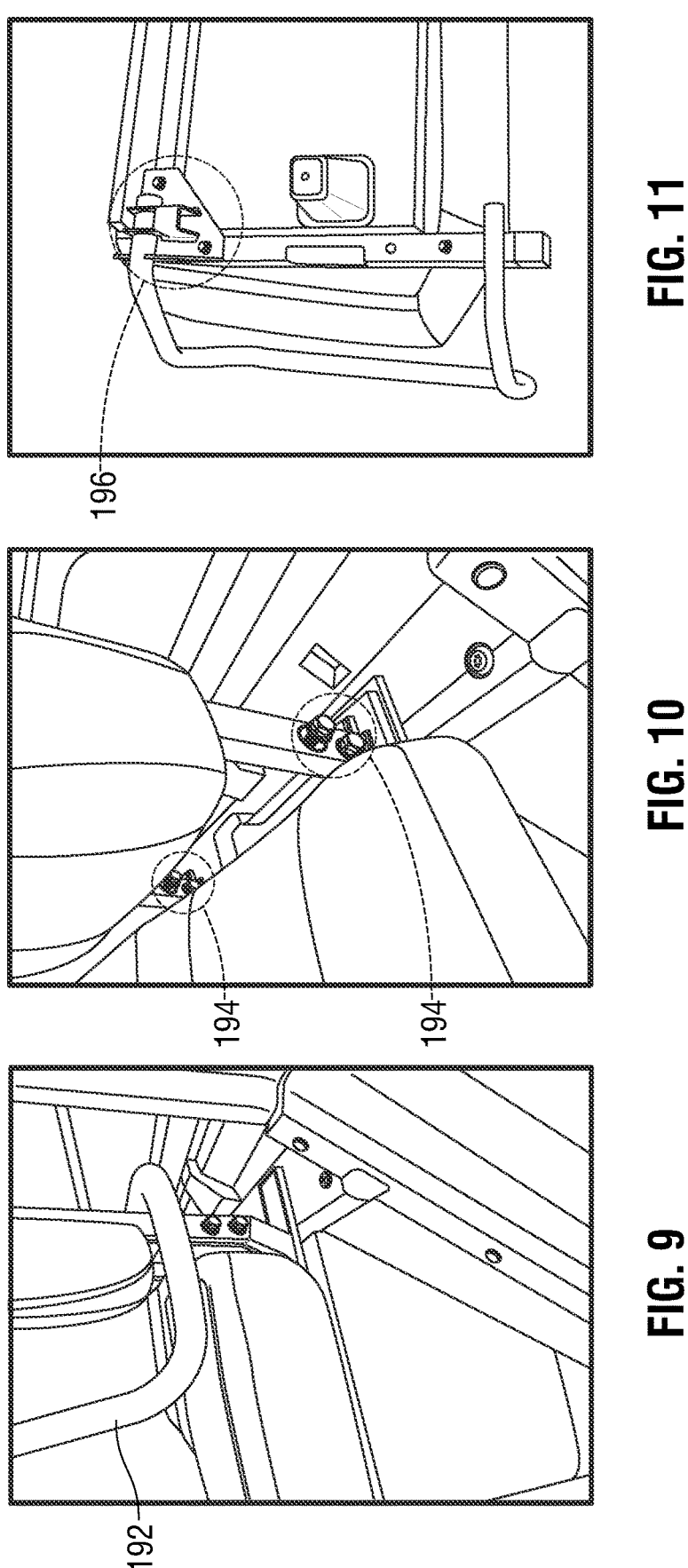
FIGS. 9-11 are views illustrating removal of the driver arm rest.

Next, the factory arm rests are removed from the UTV/ATV, the front driver arm rest 192 (FIG. 9) is removed by temporarily removing the seat mounting hardware at 194 (FIG. 10), and removing the fasteners at 196 in FIG. 11, allowing the arm rest to be detached from the seat. The fasteners removed at 194 and 196 are then returned to their mounting holes.

Figure 12:
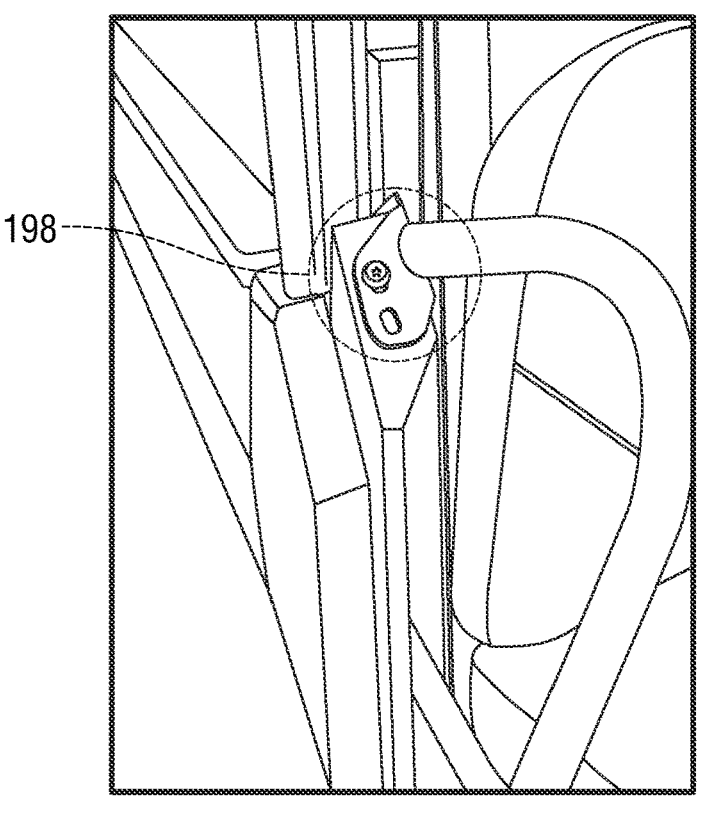
FIGS. 12 and 13 are views illustrating removal of the passenger arm rests.
Figure 13:
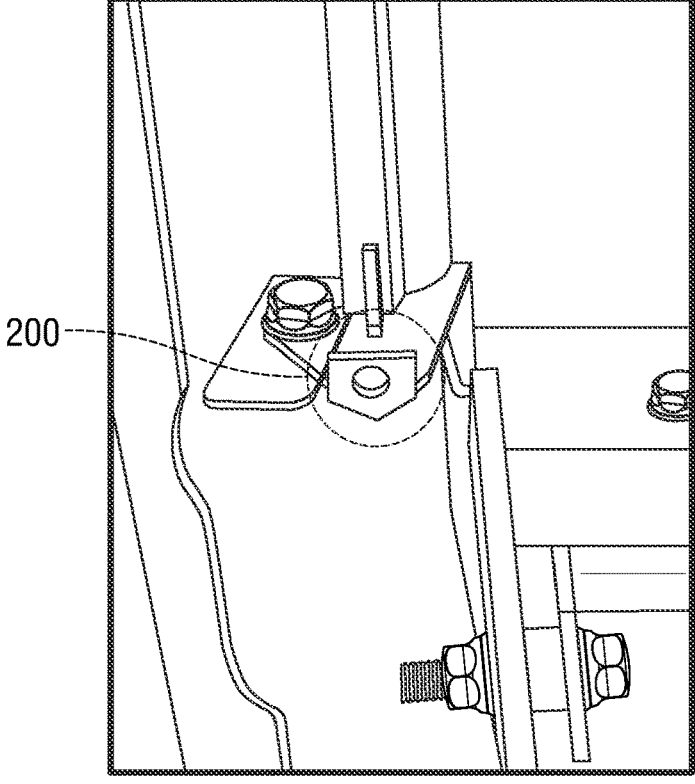

The rear and front passenger arm rests are removed in accordance with FIGS. 12 and 13, wherein upper mounting bolts 198 is removed and then lower mounting bolt 200 is removed, allowing the arm rest to be taken off.

Figures 14, 15, 16:
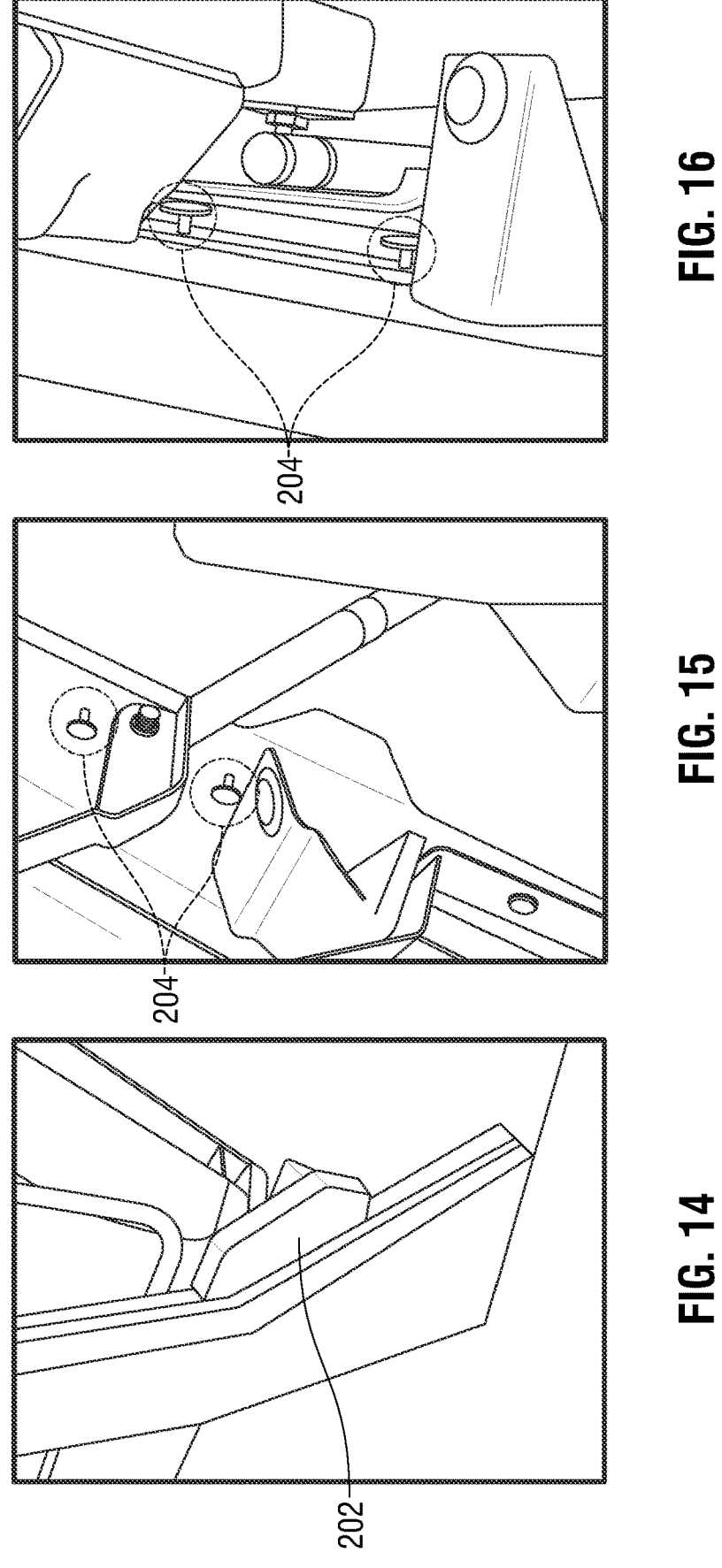
FIGS. 14-16 illustrate removal of filler panels.

Now, with reference to FIGS. 14-16, filler panels 202 are removed from the front and rear passenger side of the UTV/ATV, and the mounting bolts 204 thereof are returned to their mounting holes.

Figures 17, 18, 19:
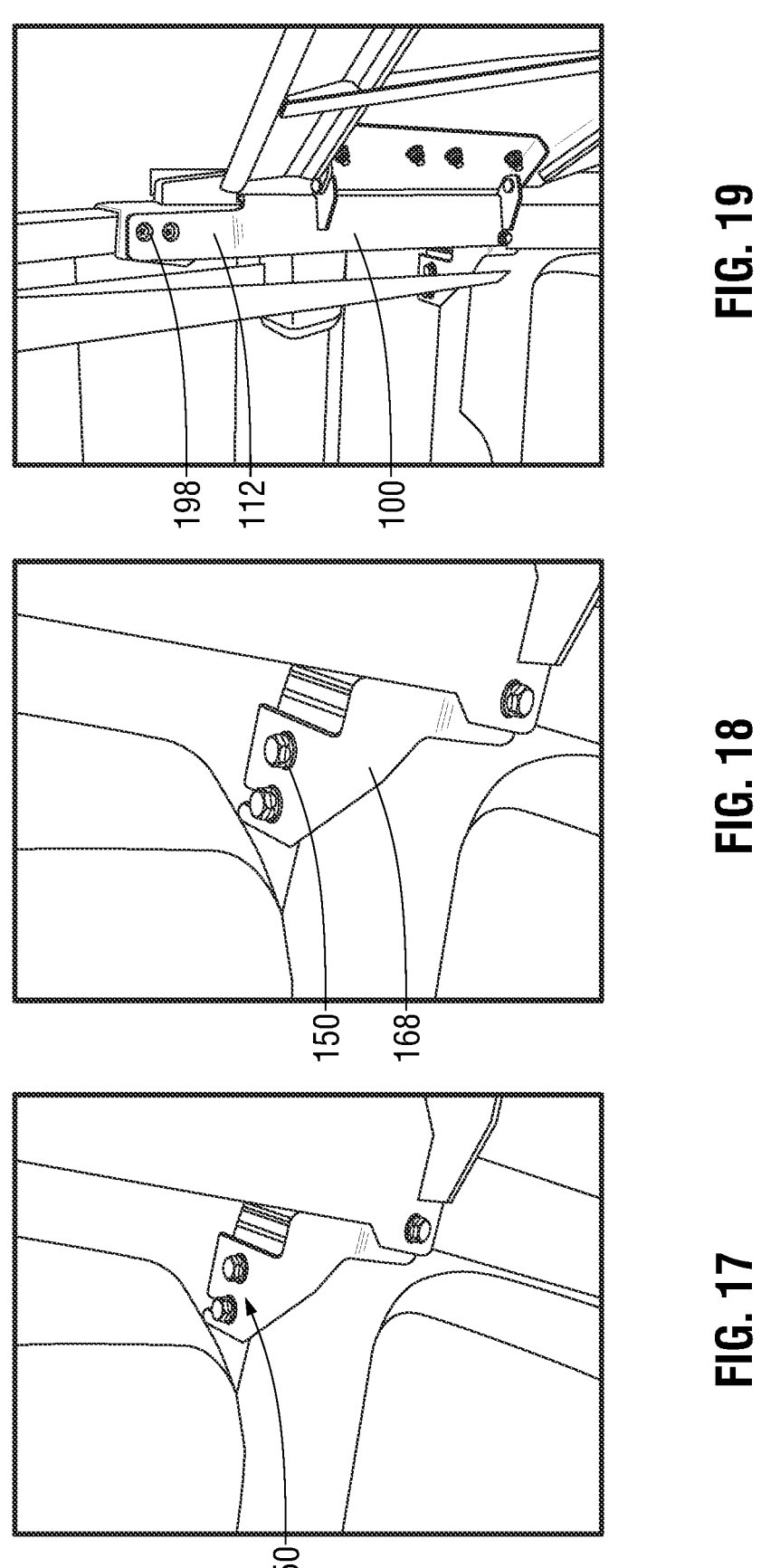
FIGS. 17 and 18 illustrate attachment of the front and rear lower mounting brackets.
FIG. 19 shows the mounting of the hinge assembly to the UTV/ATV.

Now, as shown in FIGS. 17 and 18, the front and rear lower brackets 148 and 168 are mounted to the UTV/ATV, both on the driver side and the passenger side. In some cases this mounting may be done using the reserved factory hardware 150 from FIG. 17, to mount the brackets, depending on the specific configuration of the UTV/ATV. The fasteners are just loosely tightened at this time. In the UTV/ATV configuration illustrated, the front most of the 2 mounting holes 150 in the front bracket are used for the mounting fastener, whereas the rear most mounting hole 170 is used for the rear brackets.

Referring now to FIG. 19, the hinge assembly 100 may be mounted to the UTV/ATV frame by using the mounting hardware 198 reserved in the step shown in FIG. 12 to secure the shorter upper portion 112 of frame mounting plate 102 to the UTV/ATV frame via mounting holes 116 and 118 of the hinge assembly. While the mounting hardware 198 is loose, the hinge assembly is positioned such that a gap at the upper and lower portion thereof is about equal, and then the hardware 198 is tightened to secure the hinge assembly to the UTV/ATV. One such hinge assembly is mounted to the UTV/ATV frame for each of the doors.

Figures 20, 21:
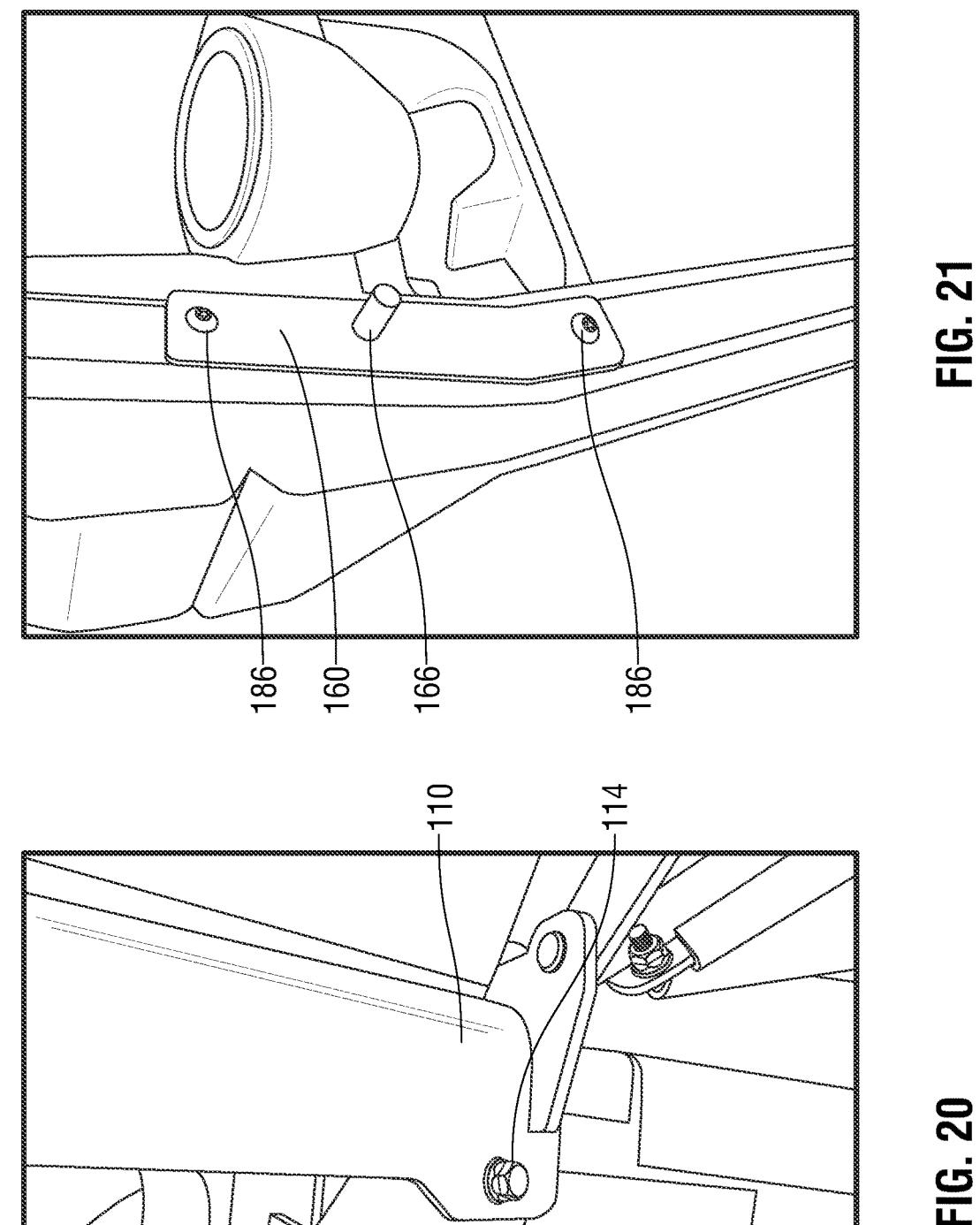
FIG. 20 illustrates mounting the hinge plate to the lower mounting bracket.
FIG. 21 is a view showing the attachment of the front striker plate.

Now, referring to FIG. 20, the is hinge plate is secured to the lower bracket 148 via a fastener that is passed through hole 114 in lower end of the flange portion 110 of the hinge and hole 158 in the lower bracket. This is repeated for the other doors (using hole 176 in rear lower bracket 168, for the rear doors). The hinge assembly is now fully mounted to the UTV/ATV.

Referring to FIGS. 21-24, the reserved hardware from the front doors indicated at 186 in FIG. 8, is used to mount the front striker brackets 160 to the UTV/ATV frame. For the rear striker brackets, referring to FIG. 22, bolts 206 are removed from the UTV/ATV frame that mount the factory rear latch 208, and exposing fastener holes 210 (FIG. 23). The rear striker bracket is now mounted to the UTV/ATV frame by using fasteners through mounting holes 180 in rear striker plate mounting plate portion 178. Rear striker 212, first mentioned in connection with FIG. 7, is visible in FIG. 24

Figure 25:
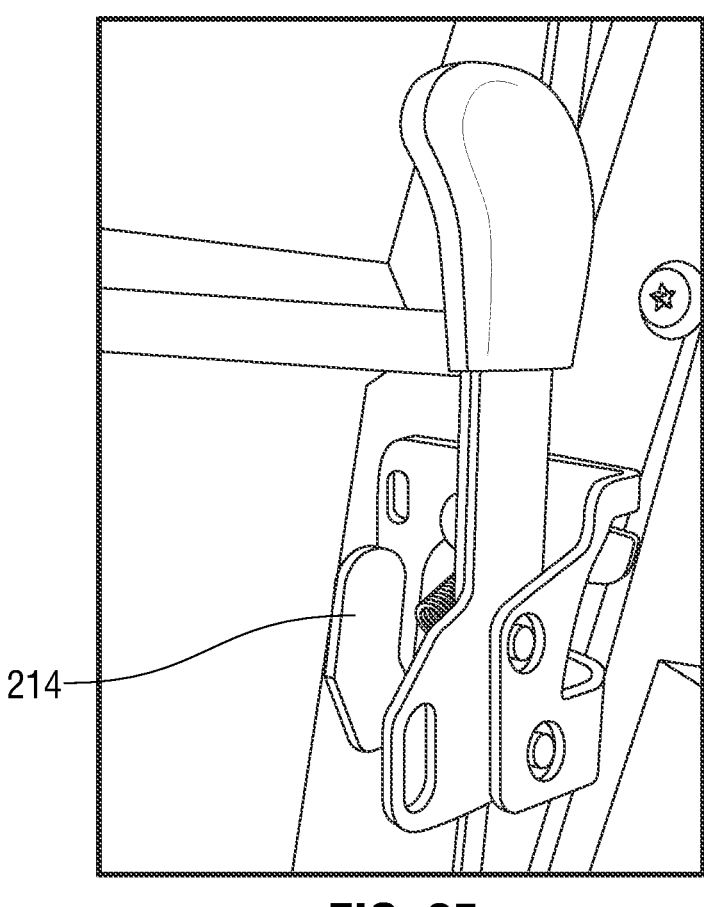
FIG. 25 shows the latching mechanism.
Figure 26:
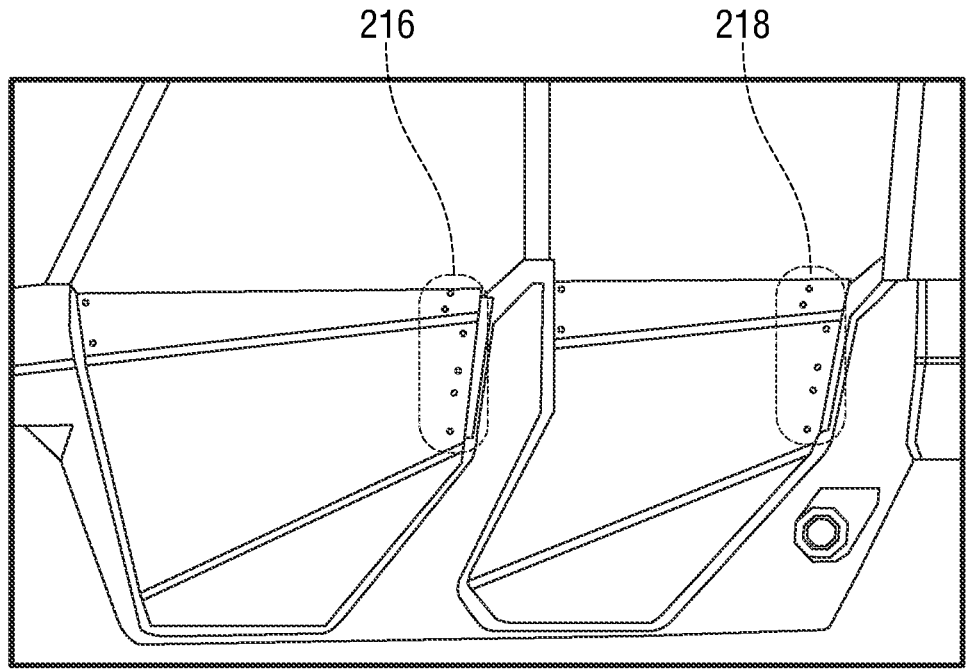

Now the doors can be mounted to the UTV/ATV. Referring to FIGS. 25-27, the doors are positioned at the frame of the UTV/ATV by moving the door into position and engaging the striker with the door latch 214 (FIG. 25). The UTV/ATV will now appear as shown in FIG. 26, with the hinge assembly positioned in the inside faces of the doors at positions indicated at 216, 218. As shown in FIG. 27, plural bolts/fasteners 220 mount the door to mounting plate 104 via mounting slots 126, 128, 130, 132. The door is now securely mounted to the UTV/ATV.

Adjustment of the door to fine tune the alignment thereof is accomplished by loosening the bolts in the mounting slots 126-132, and then repositioning the door. The two Latch Adjustment bolts on the door can be loosened to reposition the latch for adjustment thereof.

Once the doors are attached, the removed seat components may be reinstalled.

Accordingly, an improved method and apparatus for mounting doors to an UTV/ATV has been shown and described.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

I claim as follows:

1. A hinge system for mounting a door to a frame of a UTV or an ATV, comprising:

a frame mounting plate formed as a planar body with a single bend, the single bend defining an upper portion on a first side of the single bend and a lower portion on a second side of the single bend, wherein the angle of the single bend is chosen to conform said upper portion to substantially fit a first surface of the frame of the UTV or ATV, while said lower portion conforms to fit a second surface of the frame of the UTV or ATV;

a door mounting plate, hingedly engaged with the frame mounting plate for attaching said door to said UTV or ATV;

an upper frame flange attached to said frame mounting plate and a lower frame flange attached to said frame mounting plate, the upper frame flange and the lower frame flange spaced a first distance from one another along an extent of the frame mounting plate;

and in which said door mounting plate comprises:

an upper door flange of said door mounting plate, and a lower door flange of said door mounting plate, said upper door flange and said lower door flange spaced a second distance apart from one another along an extent of said door mounting plate, such that a first hinge pin goes through the opening in the upper frame flange and the upper door flange and a second hinge pin goes through openings in the lower frame flange and the lower door flange.

2. The hinge system according to claim 1, further comprising clips for securing each of said first and second hinge pins in position in said openings.

3. The hinge system according to claim 1, further comprising a bushing positioned inside said openings in said upper door flange and said upper frame mounting flange and in said openings of lower door flange and said lower frame mounting flange, the hinge pins extending through the bushings.

4. The hinge system according to claim 1, further comprising a striker bracket adapted to mount to the frame of the UTV or ATV, said bracket having a striker member for engagement with the door when the door is closed.

5. The hinge system according to claim 1, wherein said door comprises a full panel door.

6. The hinge system according to claim 1, wherein said door comprises a partial panel door.

7. A method for replacing a mesh door of an UTV or ATV with a panel door, comprising the steps of:

removing the mesh door;

mounting a door mounting plate onto the panel door;

attaching a frame mounting plate to a frame of the UTV or ATV, said frame mounting plate formed as a planar body with a single bend, the single bend defining on a first side of the single bend an upper portion and the single bend defining on a second side of the single bend a lower portion, said upper and lower portions being at an angle to one another defined by the single bend, said angle chosen to conform said upper portion to substantially fit a first surface of a frame of the UTV or ATV, while said lower portion conforms to fit a second surface of the frame of the UTV or ATV;

wherein a first hinge pin extends through aligned holes in the door mounting plate and the frame mounting plate to hingedly attach said panel door to the UTV or ATV;

the frame mounting plate comprises an upper frame flange and a lower frame flange are attached to the frame mounting plate, the upper frame mounting flange and the lower frame mounting flange being spaced a first distance from one another along an extent of the frame mounting plate;

said door mounting plate comprises:

an upper door flange, and a lower door flange, said upper and lower door flanges being spaced a second distance apart from one another along an extent of said door mounting plate, wherein the through aligned holes in the door mounting plate and the frame mounting plate are in the upper frame flange and upper door flange, respectively.

8. The method according to claim 7, further comprising:

attaching a striker bracket to the frame of the UTV or ATV, said striker bracket having a striker pin for engagement with the door when the door is closed.

9. The method according to claim 7 in which:

said upper door flange, said lower door flange, said upper frame flange and said lower frame flange all have hinge openings defined therein, wherein a first hinge pin is received in the openings in said upper door mounting flange and said upper frame mounting flange, and a second hinge pin is received in openings in said lower door flange and said lower frame flange, whereby a hinge mechanism is formed.

10. The method according to claim 9, further comprising providing a clip member for securing one of said first and second hinge pins in position when received in said openings.

11. The method according to claim 9, further comprising positioning a bushing inside at least one of said openings in said upper door flange, said upper frame flange lower door flange and said lower frame flange.

12. The method according to claim 7, wherein said panel door comprises a full panel door.

13. The method according to claim 7, wherein said panel door comprises a partial panel door.

14. The method according to claim 7, wherein the method is performed for two doors of the UTV or ATV.

15. The method according to claim 7, wherein the method is performed for four doors of the UTV or ATV.

16. The hinge system of claim 1 in which the door mounting plate, the upper door flange and the lower door flange are formed from a single piece of metal.

17. The hinge system of claim 1 in which said door mounting plate comprises a planar body with a first bend toward a first end and a second bend toward a second end, the portion between the first bend and the second bend comprising a flat surface that includes apertures for attaching the door mounting plate to the door and the portion extending beyond the first bend defining the upper door flange, the portion extending beyond the second bend defining the lower door flange, the upper flange portion and the lower flange portion each including hinge openings.

18. A hinge system for mounting a door to a frame of a UTV or an ATV, comprising:

a frame mounting plate formed as a planar body with a single bend, the single bend defining an upper portion on a first side of the single bend and a lower portion on a second side of the single bend, wherein the angle of the single bend is chosen to conform said upper portion to substantially fit a first surface of the frame of the UTV or ATV, while said lower portion conforms to fit a second surface of the frame of the UTV or ATV and having an upper frame flange and a lower frame flange extending from the planar body, the upper frame flange and the lower frame flange each having an opening to accommodate a hinge pin;

a door mounting plate, including a center portion and an upper door flange and a lower door flange, the upper door flange and a lower door flange each having an opening to accommodate a hinge pin;

at least one hinge pin extending through the upper frame flange and the upper door flange and through the lower frame flange and the lower door flange, in which the hinge is formed by the holes in the frame mounting plate and the door mounting plate.

* * * * *